US005973739A

United States Patent [19]
Nilsson

[11] Patent Number: 5,973,739
[45] Date of Patent: *Oct. 26, 1999

[54] LAYERED VIDEO CODER

[75] Inventor: Michael Erling Nilsson, Ipswich, United Kingdom

[73] Assignee: British Telecommunications public limited company, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/313,064

[22] PCT Filed: Mar. 29, 1993

[86] PCT No.: PCT/GB93/00643

§ 371 Date: Oct. 7, 1994

§ 102(e) Date: Oct. 7, 1994

[87] PCT Pub. No.: WO93/20650

PCT Pub. Date: Oct. 14, 1993

[30] Foreign Application Priority Data

Mar. 27, 1992 [GB] United Kingdom .................. 9206860

[51] Int. Cl.[6] .................................................. H04N 7/32
[52] U.S. Cl. .......................................... 348/397; 348/398
[58] Field of Search ..................................... 348/398, 397, 348/400, 401, 402, 385, 415, 438, 437; H04N 7/30, 7/32

[56] References Cited

U.S. PATENT DOCUMENTS

| 4,723,161 | 2/1988 | Koga ....................................... 348/402 |
| 4,780,760 | 10/1988 | Waldman et al. ....................... 348/397 |
| 4,805,017 | 2/1989 | Kaneko et al. .......................... 348/401 |
| 4,933,762 | 6/1990 | Guichard et al. ....................... 348/388 |
| 4,943,855 | 7/1990 | Bheda et al. ............................ 348/398 |
| 4,969,040 | 11/1990 | Gharavi .................................... 348/398 |

(List continued on next page.)

FOREIGN PATENT DOCUMENTS

| 0397402 | 11/1990 | European Pat. Off. ......... H04N 7/30 |
| 0485230 A2 | 5/1992 | European Pat. Off. ......... H04N 7/30 |

OTHER PUBLICATIONS

Morrison et al, "Two–Layer Video Coding for ATM Networks", Signal Processing Image Communication, vol. 3, No. 2/3, Jun. 30, 1991, Amsterdam NL, pp. 179–195.

Tominaga et al, "A Video Coding Method Considering Cell Losses in ATM–Based Networks", Signal Processing Image Communication, vol. 3, No. 4, Sep. 30, 1991, Amsterdam NL, pp. 291–300.

(List continued on next page.)

*Primary Examiner*—Vu Le
*Attorney, Agent, or Firm*—Nixon & Vanderhye P.C.

[57] ABSTRACT

A layered coder includes a lower resolution predictive encoder (102) and a higher resolution encoder (402) providing coded low and high resolution signals at lines (110) and (218) respectively. The prediction error of the lower resolution predictive encoder (102) is provided as a prediction error estimate to the higher resolution encoder (402), the prediction error estimate being subtracted from the prediction error generated in the higher resolution predictive encoder (402) by the subtractor (210). This difference from the subtractor (404) is coded by the coder (212) whose output is made available on the line (218). The prediction error estimate from the up sampler (130) is added to the output from the decoder (220) by an adder (406) in order to complete the predictive loop of the higher resolution predictive encoder (402). The prediction error estimate can also be subtracted from the prediction error of the higher resolution predictive encoder in the transform domain. The layered coder makes available both higher and lower resolution coded signals, with good coding efficiency as the coding information obtained from the lower resolution encoder (102) is used in the coding carried out by the higher resolution predictive encoder (402).

13 Claims, 8 Drawing Sheets

U.S. PATENT DOCUMENTS

| | | | |
|---|---|---|---|
| 5,202,760 | 4/1993 | Tourtier et al. | 398/398 |
| 5,218,435 | 6/1993 | Lim et al. | 348/398 |
| 5,235,420 | 8/1993 | Gharavi | 348/400 |
| 5,253,058 | 10/1993 | Gharavi | 348/415 |
| 5,276,525 | 1/1994 | Gharavi | 348/398 |
| 5,446,495 | 8/1995 | Tourtier et al. | 348/398 |

OTHER PUBLICATIONS

Ghanbari, "Two–Layer Coding of Video Signals for VBR Networks", IEEE Journal on Selected Areas in Communications, vol. 7, No. 5, Jun. 30, 1989, pp. 771–781.

Tourtier et al, "Motion Compensated Subband Coding Schemes for Compatible High Definition TV Coding", Signal Processing: Image Communication 4, vol. 4, No. 4/5, Aug. 1992, pp. 325–344.

"Predictive Coding Schemes For Subband Image Coders", Bamberger et al, 1989 IEEE Conference Proceedings, pp. 872–877.

"Motion Compensated 3–Dimensional Wave–Form Image Coding", Kronander, ICASSP 1989: Acoustics, Speech & Signal Processing Conference, pp. 1921–1924.

Three–Dimensional Subband Coding of HDTV Signals with 140 Mbits/s, IEEE Conference Pub. 307, 1989, pp. 270–274.

LAYERED VIDEO CODER

This application claims the benefit under 35 U.S.C. §365(c) of International Application Number PCT/GB93/00643 filed on Mar. 29, 1993.

FIELD OF THE INVENTION

This invention relates to layered video coders for coding a series of video signals and in particular to a coder comprising a lower resolution coder and a higher resolution coder. These two coding layers may be part of a multi-layered coder having two or more layers of coders.

BACKGROUND OF THE INVENTION

There is a general requirement for coders which can provide outputs which allow decoding at a receiver selectively at least two different coding schemes. For example, a coder could transmit signals which could be decoded to provide lower or higher resolution depending on the receiving equipment. This principal is extendable to multi-layered coders.

One known way of configuring such a hybrid, or compatible, layered coder is shown at FIG. 1 in which a base layer is coded at a lower resolution with the higher resolution differences being coded by a second coder to form an enhancement layer which codes the differences (error signals) between the decoded base layer and the input signals. A receiving decoder can either decode the base layer alone to provide a lower resolution picture or obtain a higher resolution picture by further decoding the enhancement layer and adding that to the decoded base layer signals.

In such prior art coding schemes the enhancement layer coder does not carry out any predictive coding on the error signal between the base layer coded signal and the input signal.

Where the higher resolution coding scheme is to operate at high bit rates, for example 5 to 10 Mbit/s, the amount of overhead data associated with predictive coding using motion vectors, for example, is very small relative to the coded data. In these cases the picture quality is optimised by providing such predictions and efficiently coding the prediction error of the predictive coder.

One known approach to a hybrid coder in which the higher resolution coder utilizes predictive coding is shown at FIG. 2. In order to utilise the output of the lower resolution coder, the decoded output of the lower resolution coder is used as a estimate of the signal to be encoded by the higher resolution coder. This estimate is used in preference to the estimate provided by the higher resolution coder when it provides a better estimate.

In practice it has been found that if the incoming video signals to be encoded is an intraframe then the coded signal provided by the lower resolution coder does provide an estimate which can be subtracted from the incoming frame and the difference subsequently coded. However, the prediction provided by the base layer coder contains at best only the low frequencies of the incoming video frame and in practice will also include low frequency coding errors. This prediction is found to be only very rarely better than the prediction based on the output of the higher resolution coder which at the higher bit rate concerned are very near to the original pictures. The higher resolution coder therefore rarely uses the output from the lower resolution coder as a prediction and the bits allocated to these lower resolution pictures in the base layer do not, therefore, generally contribute to the full resolution output picture quality.

For applications in which intracoding may be infrequent, for example in continuous broadcasts of video-conference pictures, the prior art coding scheme of FIG. 2 will in most cases perform as if there were two independent coders each providing their respective lower and higher resolution coded pictures.

It has been shown that multi-layered coding is no less efficient than single-layer coding provided that overheads can be ignored. This assumes that a single prediction error is partially coded by each layer, in which case all the transmitted bits contribute towards the higher resolution layer's codes picture quality. This is an indication, therefore, that the prior art configuration of FIG. 2 is not operating efficiently as in most cases the lower resolution bits do not contribute to the high resolution picture quality.

SUMMARY OF THE INVENTION

According to the present invention a multi-layered coder for coding a series of video signals comprises a lower resolution coder and a higher resolution coder, in which the lower resolution coder provides a prediction error estimate which is subtracted from a prediction error generated by the higher resolution coder.

The prediction errors may be in the pixel domain or, in the case of a coder employing a transform coding technique (eg a DCT transform) the subtraction can be carried out in the transform domain.

This contrasts with the arrangement of FIG. 2 in which the lower resolution coder provides an estimate of an input video signal to be coded. In this case the lower resolution coder provides an estimate of the prediction error to be coded by the higher resolution coder and is always subtracted from it, the residual prediction error then being encoded by the higher resolution coder. This arrangement provides that the bits coded by the lower resolution coder always contribute to the coding of the higher resolution coder.

This can be achieved in at least two distinct ways. The lower resolution coder can encode the input signal, the prediction error estimate being provided in the pixel or transform domain by the lower resolution coder, or alternatively the higher resolution coder can form a prediction error, and the lower resolution coder can code this prediction error with the prediction error from the lower resolution coder constituting the prediction error estimate. In the latter case the lower resolution coder codes prediction errors generated by the higher resolution coder.

In order to obtain properly decoded video signals using only the lower resolution data it is necessary to have an intrapicture coded initially, in which case the output will be a lower resolution coding of that picture, and the subsequently coded prediction errors can be used to update that lower resolution picture to provide the subsequent frames. However, because the prediction errors are those generated by the higher resolution coder the video signals reconstituted from the lower resolution coded signals will drift from the pictures that would have been reproduced had the lower resolution coder provided coding of its own prediction errors. This necessitates repeated coding of intrapictures at a frequency determined empirically by the amount of drift acceptable.

In the former way of implementing the present invention the lower resolution coder operates in a closed loop on the input signals and codes prediction errors in the usual way for a predictive coder. In this case the prediction error from the lower resolution coder provides the prediction error estimate which is subtracted from the prediction error of the higher resolution coder. Because it is operating in a closed loop configuration, the lower resolution coder provides an output which can be directly decoded by a compatible, lower resolution decoder without the drift of the previous system. However, the lower resolution coder is no longer coding the prediction error from the higher resolution coder but providing an independent prediction error based on the lower resolution coding operation. In this case the prediction error from the lower resolution coder is likely to drift from the prediction provided by the higher resolution encoder and therefore become less close to it as successive frames are coded.

A further arrangement of multi-layered coder according to the present invention includes a lower resolution coder which codes a signal from an options selector, the signal from the options selector being a function of the prediction error of the higher resolution coder and the prediction error generated by the lower resolution coder. This arrangement should be more versatile as it can be configured to operate in a manner tailored to a particular application. In particular, the signal from the options selector could, for example, be alternately the prediction error of the higher resolution coder and the prediction error generated by the lower resolution coder. The alternation could take place at any level from pixels to groups of frames.

A preferable arrangement of the present invention is therefore a coder which is configured to operate alternately according to these two methods of operation so that a compromise can be made between the two, the rate at which the two schemes alternate being determined by the particular application or circumstances.

The lower resolution coding scheme could be for example based on the H.261 or MPEG1 coding scheme with the second (and higher levels, if present) providing compatibility with higher resolution coding schemes.

BRIEF DESCRIPTION OF THE DRAWINGS

Embodiments of the present invention and of the prior art will now be described, by way of example only, with reference to the accompanying drawings in which.

DETAILED DESCRIPTION OF THE DRAWINGS

Figure 1:
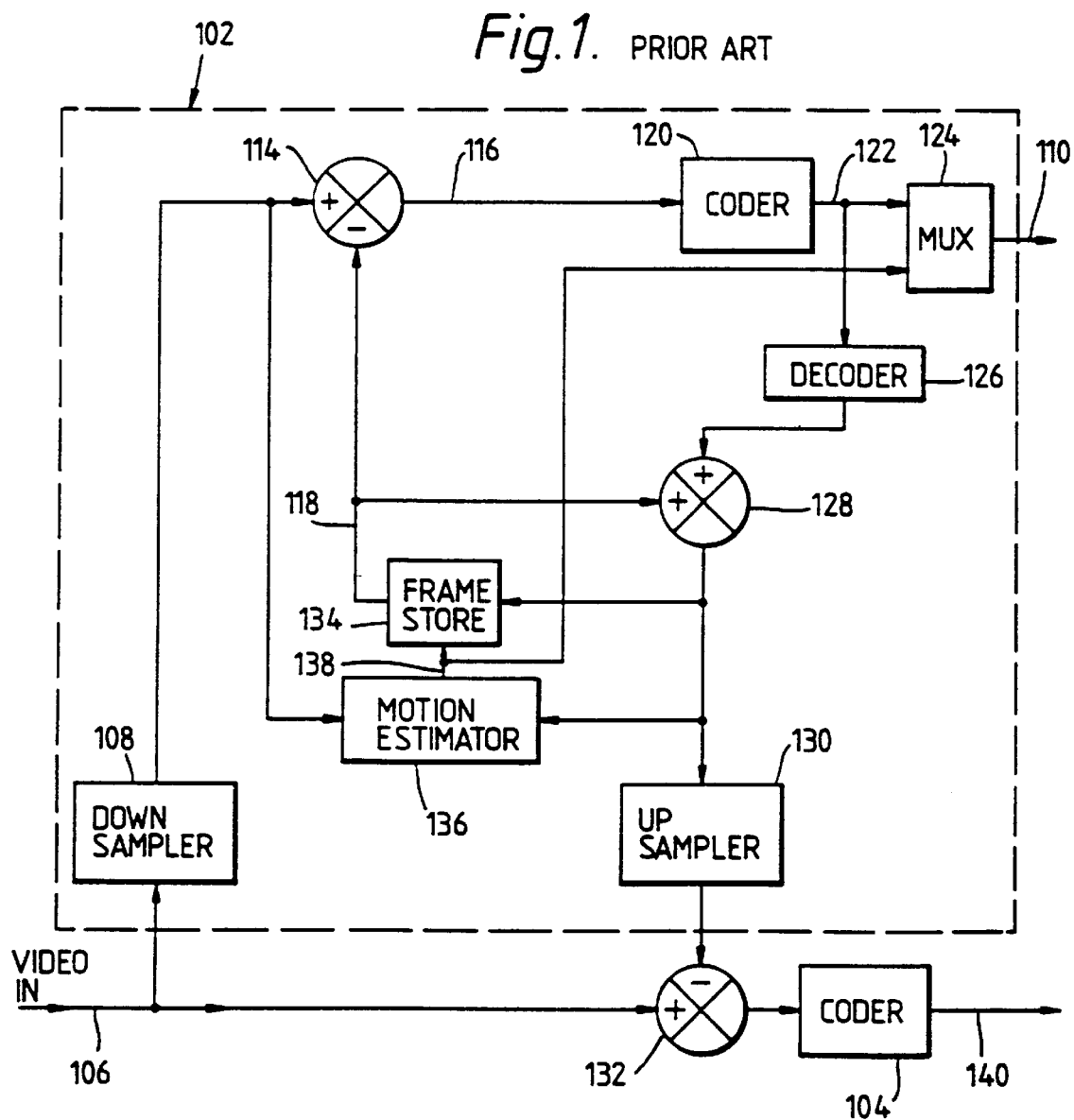
FIG. 1 is a schematic diagram of a prior art two-layer coder comprising a basic layer coder and an enhancement layer coder.

Referring to FIG. 1 there is shown a prior art coder which comprises a lower resolution predictive coder 102 and a higher resolution coder 104.

The lower resolution predictive coder 102 is a motion compensated, predictive coder. A digital video signal representative of a high resolution 704×576 pixel frame is input to a down sampler 108 which converts the digital video signals to a 352×288 pixel video signal. The lower resolution predictive coder 102 outputs a lower resolution coded digital error signal at output line 110 for onward transmission to a remote decoder (not shown). The lower resolution output signal codes the difference between the down sampled digital video signal input to the predictive coder 102 and the motion compensated prediction of the input video signal generated internally within the lower resolution predictive coder 102.

The lower resolution predictive coder 102 comprises a subtractor 114 which produces a lower resolution prediction error on line 116 which is the difference between the down sampled digital video input signal from down sampler 108 and a next frame prediction digital video signal generated on a line 118.

The lower resolution predicted error on line 116 is input to a quantiser-DCT coder 120, the coded prediction error being output on line 122 and input into multiplexer 124.

The coded lower resolution prediction error from the coder 120 is input to a decoder 126 which provides the inverse operation to the coder 120. The output from the decoder 126 is input to an adder 128 together with the next frame prediction on line 118. The adder 128 provides a digital video signal output which will be that provided by a lower resolution decoder receiving the output on line 110. The output from the adder 128 is up sampled by up sampler 130 whose output is input to a subtractor 132 which subtracts the signal from the up sampler 130 from the digital video signal input on line 106.

The prediction signal on line 118 is obtained from a frame store 134 which contains the output of the adder 128 shifted according to motion vectors output by a motion estimator 136, which motion vectors are derived from the down sampled input signal from down sampler 108 and the previous next frame prediction digital video signal from the adder 128. The motions vectors are output from the motion estimator 136 on line 138 for input to the frame store 134 and to the multiplexer 124 which combines the motion vectors with the output from the coder 120 for output via the line 110.

The higher resolution coder 104 codes the difference between the lower resolution decoded video signals from the lower resolution predictive coder 102 and the higher resolution input digital video signals 106 to provide enhancement layer, higher resolution coded signals on the output line 140.

The lower resolution coded signals from output 110 can be decoded by a lower resolution decoder (not shown) to provide a lower resolution version of the input video signals on line 106. The same output signals on line 110 together with the output signals on line 140 can be combined to form a higher resolution decoded version of the input video signals on line 106. That is, the output of the prior art coder of FIG. 1 provides outputs which are compatible to both a lower resolution and higher resolution decoder.

Figure 2:
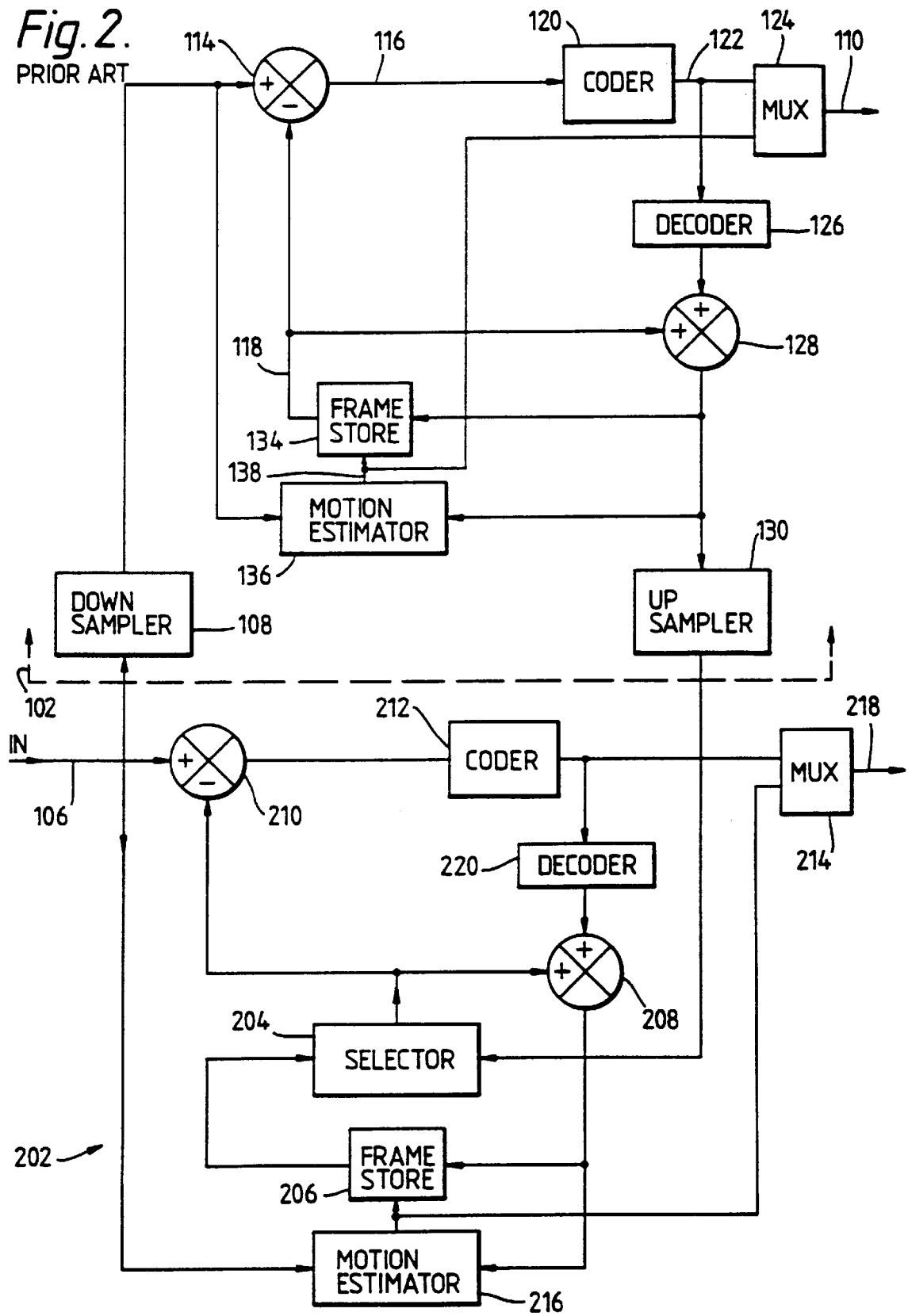
FIG. 2 is a schematic diagram of a prior art coder in which a lower resolution coder provides an estimate of the incoming signal to be coded by a higher resolution coder.

FIG. 2 shows a second prior art arrangement having the same lower resolution predictive coder 102 as shown in FIG. 1 (with components given the same reference numerals) but in which the coder 104 is replaced by a motion compensated higher resolution motion predictive coder 202. The higher resolution predictive coder 202 includes a selector 204 which can be set, as will be described later, to connect the output from the frame store 206 to both an adder 208 and a subtractor 210. The output from the up-sampler 130 of the lower resolution predictive coder 102 is not selected in this position.

With the selector 204 connected as just described the higher resolution predictive coder 202 operates as does the lower resolution predictive coder 102 described previously, only in this case a higher resolution prediction error from the subtractor 210 is coded by a higher resolution coder 212 and the output coded higher resolution prediction error is multiplexed by a multiplexer 214 with motion vectors from a motion estimator 216 to provide a higher resolution coded output on line 218. The decoder 220 comprises the inverse operation of the coder 212.

With the selector 204 connecting the frame store 206 to the subtractor 210 and adder 208, the lower resolution predictive coder 102 and higher resolution predictive coder 202 operate independently and in parallel: a lower resolution coded video signal is output on line 110 and a higher resolution coded video signal is output on line 218.

The selector 204 can be set to a second switch position in which the output from the up-sampler 130 is connected to the subtractor 210 and the adder 208. In this configuration the lower resolution predictive coder 102 provides the next frame prediction to the predictive coder 202 and it is this lower resolution next frame prediction which is subtracted from the input digital video signal by the subtractor, the difference being coded by the predictive coder 202.

The apparatus of FIG. 2 is operated such that the selector selects as a next frame prediction the output from the frame store 206 or the output from the up-sampler 130 of the lower resolution predictive coder 102, according to whichever is closer to the digital video signal to be next encoded by the higher resolution predictive coder 202.

If the incoming digital video signal to be encoded is an intraframe, that is it must be coded without any reference to previous frames, then the lower resolution decoded picture will provide a next frame prediction which will be used by the higher resolution decoder. However, it is found that for the non-intraframes the prediction provided by the higher resolution coder is generally a better prediction than that provided by the lower resolution coder and so the coded bits from the lower resolution coder, for the majority of the time, do not contribute to the coding carried out by the higher resolution predictive coder 202.

Figure 3:
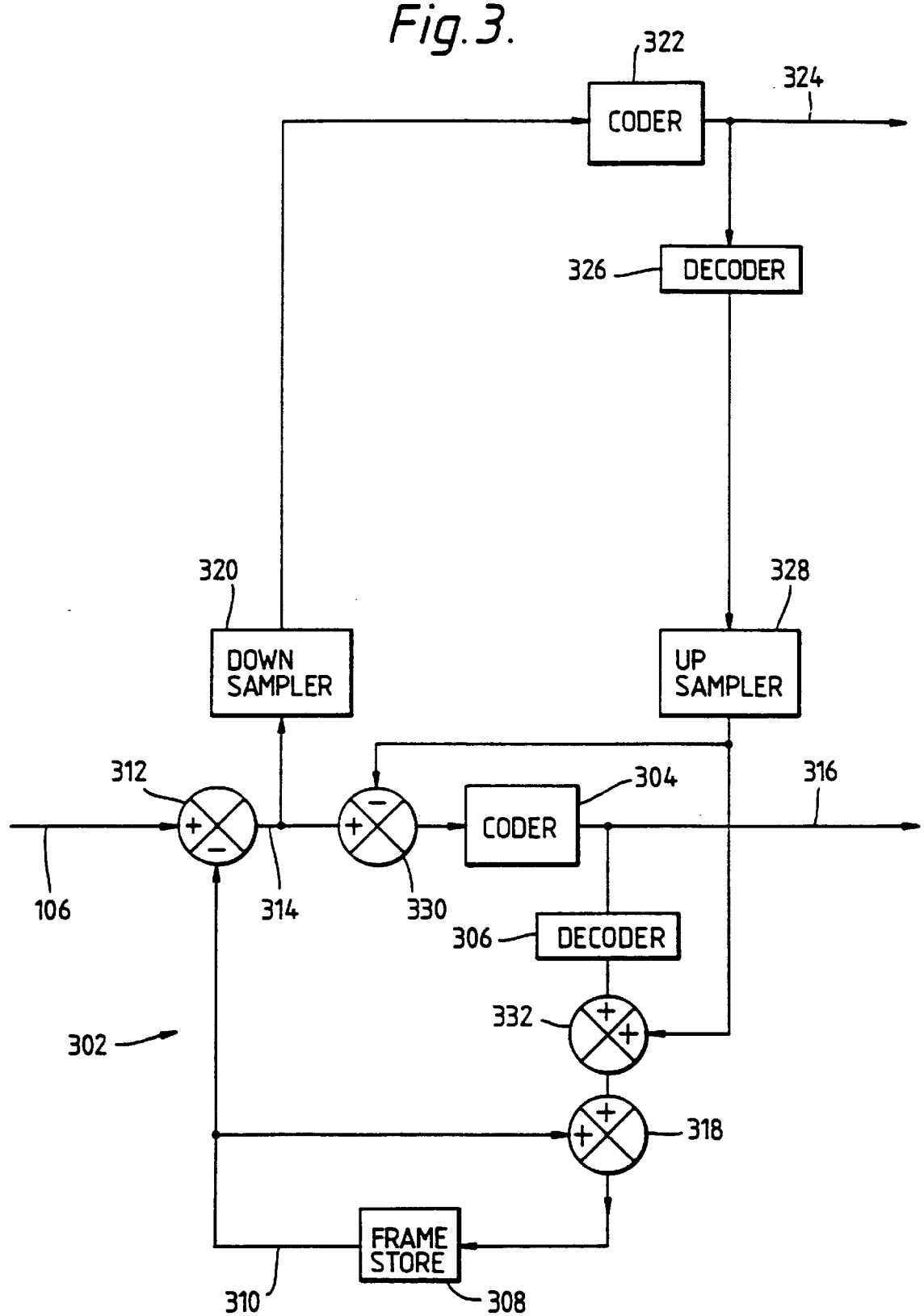
FIG. 3 is a schematic diagram of a first embodiment of the present invention.

Referring now to FIG. 3 there is shown a multi-layer coder according to the present invention for coding a video signal input on line 106. A higher resolution predictive coder 302 comprises a coder 304 and a frame store 308. The frame store 308 outputs a next frame prediction of the next digital video signal to be coded which is subtracted by subtractor 312 from the input digital video signal on line 106 to produce a higher resolution prediction error on line 314. In prior art coders this higher resolution prediction error on line 314 would be coded by the coder 304 and output on an output line 316. The next frame prediction to be stored in the frame store 308 is derived from the previous output from the frame store 308 on line 310 to which is added the decoded signal from the coder 304 from decoder 306 by adder 318.

In the predictive coder 302 of FIG. 3, however, the higher resolution prediction error on line 314 is down-sampled by down-sampler 320 the output of which is input to a lower resolution coder 322 and output on line 324. This lower resolution output from the coder 322 is then decoded by decoder 326 and up-sampled by up-sampler 328 to provide a prediction error estimate of the actual prediction error generated by the higher resolution predictive coder 302. This prediction error estimate is subtracted from the higher resolution prediction error of the higher resolution coder by subtractor 330, the output from the subtractor 330 being coded by the coder 304.

A higher resolution, reconstituted video signal can be decoded using the lower resolution bits on line 324 together with higher resolution bits on line 316. In order to provide a proper prediction for the next input digital video signal to be coded the prediction error estimate for the up-sampler 328 needs to be added to the output of the decoder 306 by an adder 332 as shown in FIG. 3.

With the arrangement of FIG. 3 the lower resolution coded bits always contribute to the coding of the higher resolution coded frames which can be reconstituted, as noted above, by using the outputs on both lines 324 and 316. Compatibility is provided in that the lower resolution video signals can be reconstituted using the lower resolution bits output on line 324 alone.

The FIG. 3 configuration requires that an intrapicture is first input to line 106 so that a lower resolution video signal representative of the entire video signal is output on line 324. Future outputs on line 324 (until a new intrapicture is to be coded) are the prediction errors generated by the higher resolution side of the coder of FIG. 3 rather than a lower resolution coding of a lower resolution prediction error based on lower resolution versions of the input video signals. The lower resolution video signals reconstituted from the lower resolution bits on output line 324 will therefore drift with time. It is necessary, therefore, to adjust the frequency of intrapictures to keep the drift down to a level acceptable for the particular application to which the coder of FIG. 3 is put.

Figure 4:
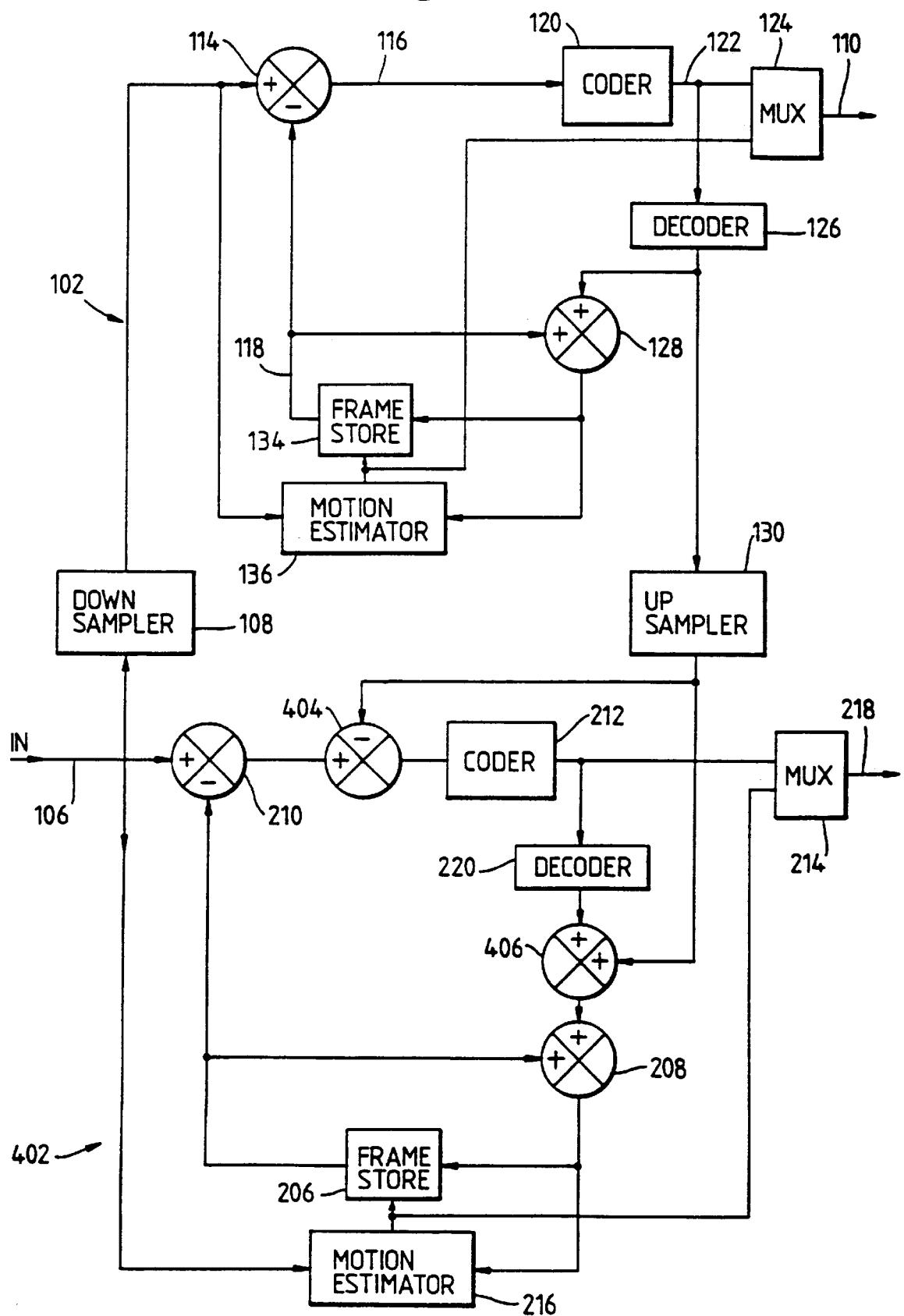
FIG. 4 is a schematic diagram of a further embodiment of the present invention.

Referring now to FIG. 4, a second embodiment of the present invention comprises a lower resolution predictive coder 102, which is as shown and previously described with reference to FIG. 2 with elements being referenced by the same reference numerals as in FIG. 2, and a higher resolution predictive coder 402 which includes the following elements of the higher resolution predictive coder 202 of FIG. 2, namely the frame store 206, the adder 208, the subtractor 210, the coder 212, the motion estimator 216, and the decoder 220 but with the selector 204 removed and with permanent connections between the frame store 206 and both the subtracting input of subtractor 210 and the adder 208.

The higher resolution predictive coder 402 of FIG. 4 also includes a subtractor 404 and an adder 406 which has the same functions as the subtractor 330 and adder 332 of FIG. 3, namely that a prediction error estimate generated by the lower resolution predictive coder 102 is subtracted from the prediction error to be encoded by the higher resolution predictive coder 402 and added to the decoded output from the decoder 220 in order to provide a proper prediction of the next input digital video signal to be coded.

In the absence of the subtractor 404 and the adder 406, that is with the output from the subtractor 210 connected directly to the coder 212 and the output from the decoder 220 connected directly to the adder 208, the apparatus of FIG. 4 operates in exactly the same manner as the prior art apparatus of FIG. 2 with a selector 204 set to operate the lower resolution coder and higher resolution coder as independent coders with respective outputs being output on lines 110 and 218. In the FIG. 4 arrangement as shown, however, the output from the up-sampler 130 provides a prediction error estimate which is input to the inverse input of the subtractor 404. In this case the prediction error estimate from the up-sampler 130 is the lower resolution prediction error derived by the lower resolution predictive coder 102 directly from the digital video signals input on line 106.

With the apparatus of FIG. 4 the lower resolution encoder is operating in a closed-loop mode which means the coded output on line 110 will not suffer the drift that is a feature of the lower resolution coded output of the open-loop coder of FIG. 3. However, in the coder of FIG. 4, the coded prediction error of the lower resolution predictive coder 102 is likely to drift from the prediction error produced by the subtractor 210 that is to be coded by the higher resolution predictive coder 402 since it is based on the lower resolution input from the down-sampler 108 rather than on the higher resolution digital video signals.

Figure 5:
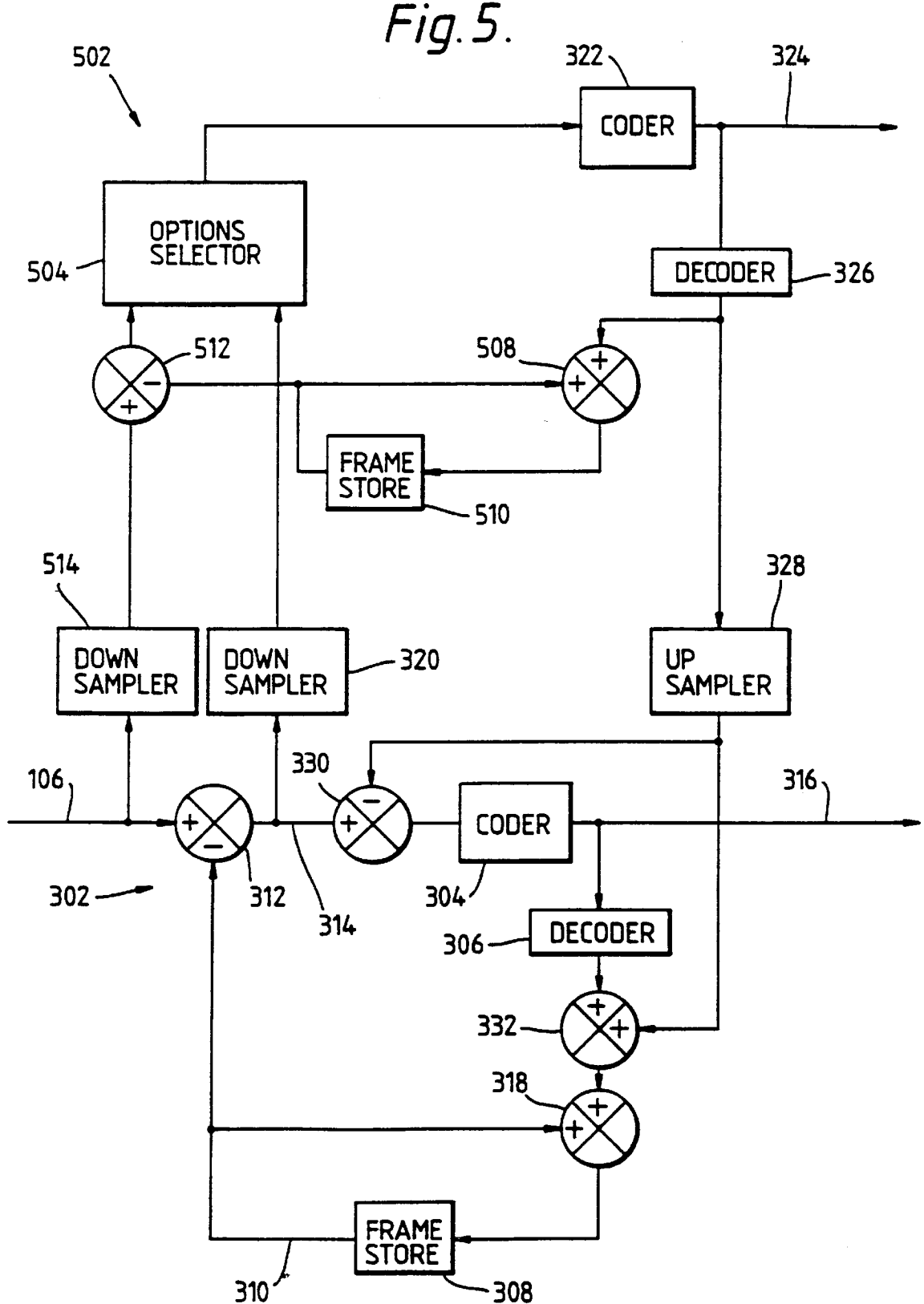
FIG. 5 is a schematic diagram of a yet further embodiment of the present invention.

Referring now to FIG. 5 there is shown a multi-layered coder which is largely as described with reference to FIG. 3 and with the elements in common having the same reference numerals. The coder of FIG. 5 includes a lower resolution predictive coder 502 which includes, further to the FIG. 3 embodiment, an options selector 504, an adder 508, a frame store 510, a subtractor 512 and a down-sampler 514.

Again, a prediction error estimate from the up-sampler 328 of the lower resolution predictive coder 502 is subtracted by the subtractor 330 from the prediction error generated by the subtractor 312 of the higher resolution predictive coder 302.

In a first exemplary configuration the lower resolution predictive coder 502 is connected to operate precisely as the lower resolution coder of FIG. 3 by switching the output from the down-sampler 320, only, to the lower resolution coder 322.

In a second exemplary configuration the options selector 504 connects the output from the subtractor 512, only, to the lower resolution coder 322. In this case the lower resolution predictive coder 302 provides a prediction error estimate, which is a lower resolution prediction error, to the higher resolution predictive coder 302. In this configuration the coder of FIG. 5 operates in the same manner as the coder of FIG. 4 except that the prediction error is not a motion compensation predicted error. Motion compensation could be added straightforwardly to provide that in this second configuration the FIG. 5 encoder operates as the motion compensated coder of FIG. 4.

The options selector 504 of FIG. 5 could be configured to switch between the two configurations at a frequency and dwell time on each configuration as is found to give the best compromise between the compatible coding outputs on lines 324 and 316 as found optimum for a given application. Alternatively, the options selector could be used to operate the apparatus in a fixed configuration.

The options selector described with reference to FIG. 5 operates to switch one of the outputs of the down-sampler 320 and the subtractor 512 to the lower resolution coder 322. It could, however, be configured to provide an output to the lower resolution coder 322 which is some other function of the outputs of subtractor 514 and down-sampler 320, for example an average, perhaps weighted, a non-linear average or some other function.

The function provided by the options selector could be fixed or variable during the coders operation. The function could be based on an assessment of the picture content, for example, or on one or more parameters derived from the coder such as the prediction error estimate and the higher resolution prediction error.

The option selected by the selector 504 can be changed between pixels of a frame or at any grosser level through frame blocks to between groups of frames, for example.

The coding schemes employed by the various lower resolution coders 120, and 322 and the higher resolution coding employed by the higher resolution coders 212, and 304 can be chosen to suit a particular application. For example, the lower resolution coders could be CCITT Recommendation H.261 and ISO 11172 (MPEG1) coders whereas the higher resolution coder could be chosen to be a higher resolution enhancement coder based on the lower resolution coder.

When a coder employs a linear transformation then subtracting the prediction error in the pixel domain or the transformation domain is equivalent and so the prediction error estimate from the lower resolution coder can be subtracted from the prediction error in the higher resolution coder in either of these domains.

Figure 6:
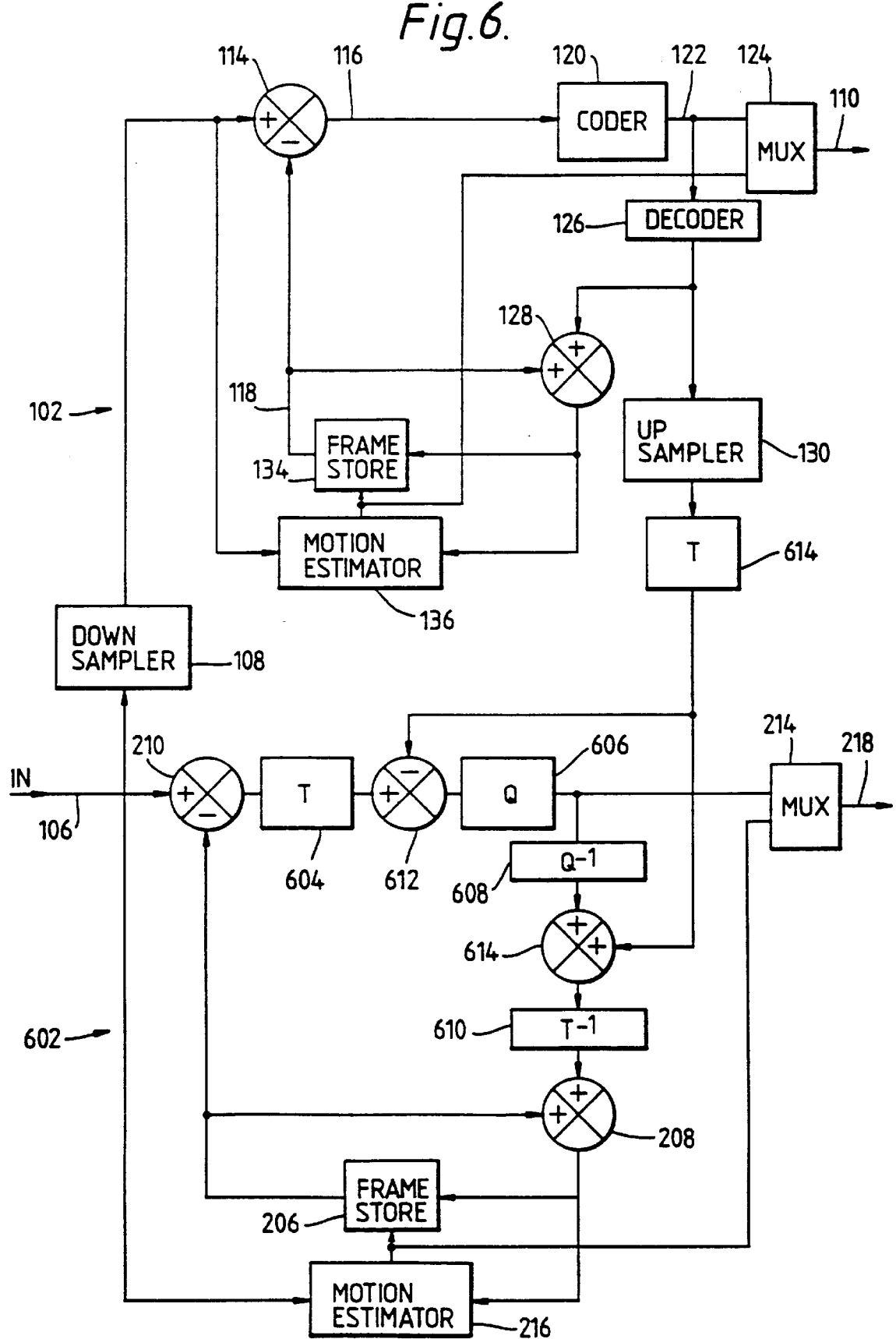
FIG. 6 is a schematic diagram of a further embodiment of the present invention.

Referring now to FIG. 6 there is shown a two-layer coder. The lower resolution predictive coder 102 is as shown and described with reference to FIG. 4.

The coder also includes a higher resolution 602 which is the same as the higher resolution predictive coder 402 of FIG. 4 except in the following respects. The coder 212 of FIG. 4 is shown split into its two component parts namely a transform 604, in this exemplary embodiment a DCT transform, and a quantiser 606. Similarly the decoder 220 of FIG. 4 is also shown in its constituent parts as an inverse quantiser 608 and an inverse DCT transform 610.

The output from the transform 604 of the higher resolution predictive coder 602 comprises the transformed prediction error from the subtractor 210. The subtractor 404 of FIG. 4 is replaced by the subtractor 612 in the higher resolution predictive coder 602 of FIG. 6 and is placed after the transform 604 so that subtraction of the prediction error estimate from the lower resolution predictive coder 102 can be subtracted in the transform domain.

In order to effect this subtraction in the transform domain the output from the up sampler 130 of the predictive coder 102 is transformed by a transform 614 the output of which is provided to the inverse input of the subtractor 612.

Analogously, the adder 406 of the higher resolution predictive coder 402 of the FIG. 4 arrangement is replaced by an adder 614 placed between the inverse quantiser 608 and the inverse transform 610 so that the higher resolution coder forms at the adder 208 a proper frame for storing in the frame store 206.

Figure 7:
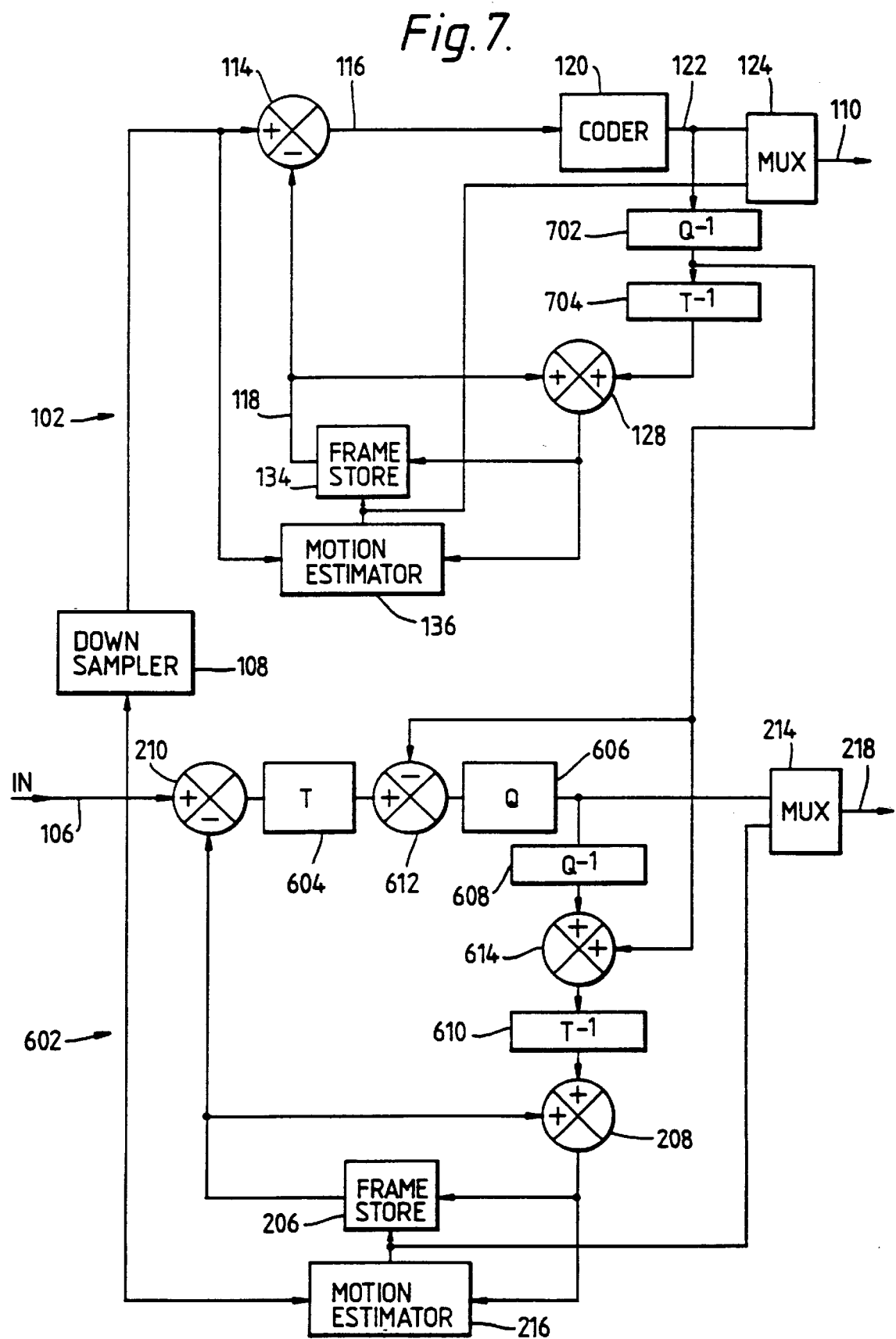
FIG. 7 is a schematic diagram of a yet further embodiment of the present invention.

Referring now to FIG. 7, there is shown a further embodiment of the present invention which is the same as the embodiment of FIG. 6 just described with like elements having the same reference numerals except for those elements of the lower resolution coder which provide the transformed prediction error estimate. In particular the decoder 126 of FIG. 6 is shown split into its constituent parts, namely an inverse quantiser 702 providing the inverse quantisation operation to that employed by the coder 120 and an inverse transform 704 providing the inverse transformation of that provided in the coder 120. The output from the inverse quantiser 702 comprises a prediction error estimate in the transform domain which can be provided directly to the subtractor 612 and the adder 614 of the higher resolution predictive coder 602.

The FIG. 7 arrangement takes advantage of the fact that the prediction error estimate is already in the transformation domain thereby avoiding the need for up conversion and later retransformation thereby reducing the hardware components of such a coder.

However, this is to be balanced against the possible disadvantage that the output may not be ideal. Closer matching of the prediction error estimate to the prediction error of the higher resolution coder may be obtained by up conversion by an up sampler which is designed to match the characteristics of the down sampler of the lower resolution coder.

The preferred route in a particular application will depend on the particular balance desired between complexity and potential gain in quality offered by the two different approaches.

Multi-layer coders having more than two layers, the coding layers providing coded signals at a series of different resolutions, can be readily constructed according to the present invention. Two of these layers, only, may be arranged according to the present invention. Alternatively, the coding layers may be arranged such that every coder other than the lowest resolution coder provides a prediction error estimate which is subtracted from the prediction error generated by the coder providing the next lower resolution coded signals. A three-layer coder according to the latter arrangement is shown in FIG. 8.

Figure 8:
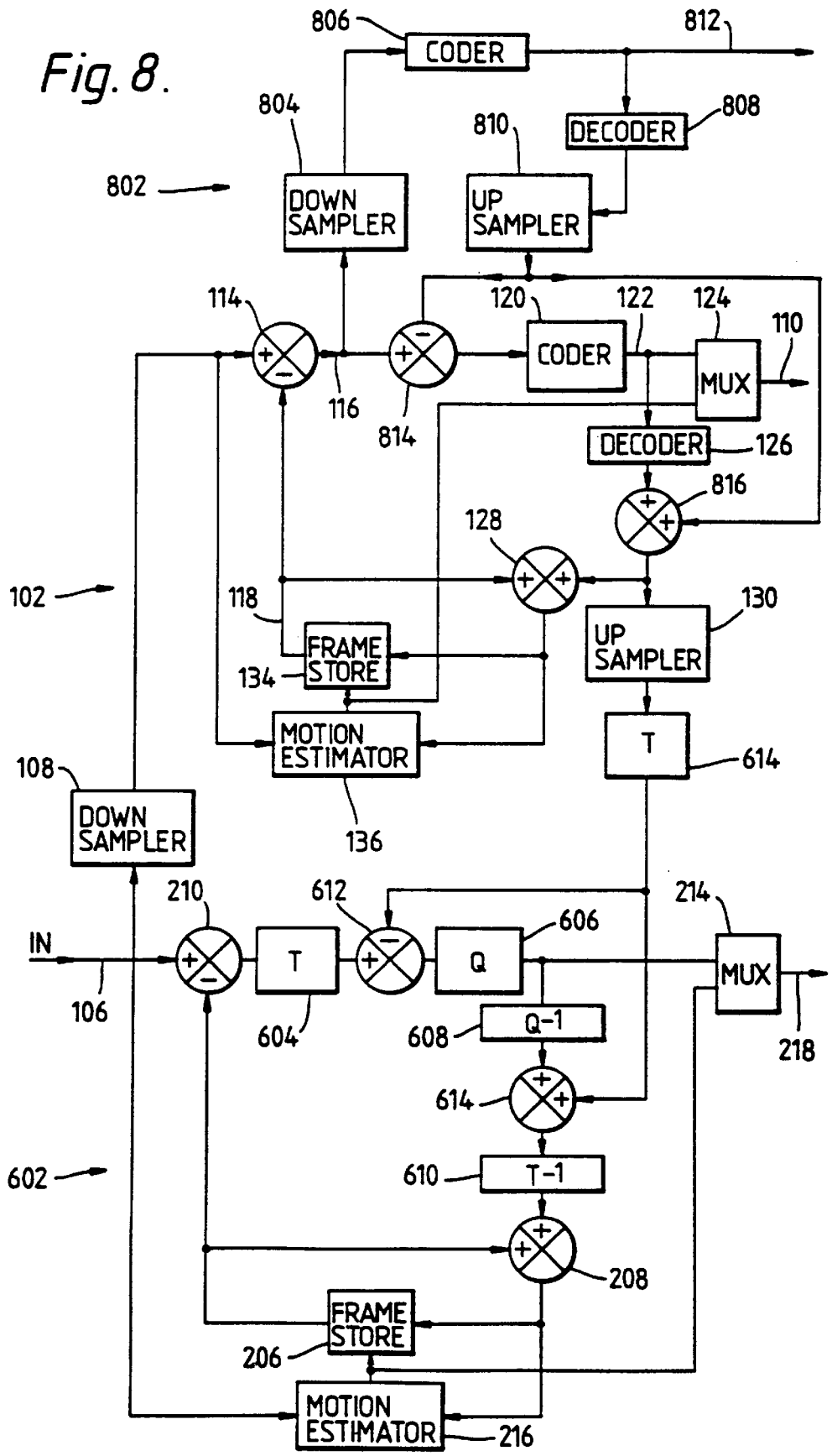
FIG. 8 is a schematic diagram of an embodiment of a three-layer coder according to the present invention.

The three-layer coder of FIG. 8 is based on the two-layer coder of FIG. 6 but in which a prediction error estimate is additionally subtracted from the prediction error generated by the prediction coder 102. This is achieved as follows.

The prediction error on line 116 is passed to a yet lower resolution coder comprising a down-sampler 804, a coder 806, an inverse coder 808 and an up sampler 810.

The coded signals from the coder 806 are output on line 812.

The output from the up-sampler 810 provides a prediction error estimate for the prediction coder 102 which is subtracted from the prediction error from the subtractor 114 by a subtractor 814. The prediction error estimate is also added to the output of the decoder 126 of the coder 102 by an adder 816 so that the correct prediction error estimate is passed to the highest resolution coder 602.

The three layers of resolution could, for example, be two TV channels having the same number of pixels per frame but with one of the TV signals having a higher image quality, ie a higher resolution within the available number of pixels in the frame, together with a HDTV signal providing higher resolution through a greater number of pixels in the transmitted frames.

I claim:

1. A layered coder for coding a series of video signals comprising a lower resolution coder and a higher resolution coder, in which the higher resolution coder generates high resolution prediction error signals indicative of differences between the video signals and predictions of the video signals and the lower resolution coder generates low resolution prediction error signals which are subtracted from the high resolution prediction error signals generated by the higher resolution coder, the low resolution prediction error signals being the decoded prediction errors of the lower resolution coder.

2. A coder as claimed in claim 1 in which the lower resolution coder codes the input video signals.

3. A coder as claimed in claim 1 in which the lower resolution coder codes the high resolution prediction error signals.

4. A coder as claimed in claim 1 in which the lower resolution coder codes a signal from an options selector, the signal from the options selector being a function of the high resolution prediction error signals generated by the higher resolution coder and the low resolution prediction error signals generated by the lower resolution coder.

5. A coder as claimed in claim 4 in which the signal from the options selector is alternately the high resolution prediction error signals generated by the higher resolution coder and the low resolution prediction error signals generated by the lower resolution coder.

6. A coder as claimed in claim 1 in which the lower resolution coder comprises an H.261 coder.

7. A coder as claimed in claim 1 in which the lower resolution coder comprises an ISO 11172 coder.

8. A coder as claimed in claim 1 in which the low resolution prediction error signals are subtracted from the high resolution prediction error signals in the pixel domain.

9. A coder as claimed in claim 1 in which the low resolution prediction error signals are subtracted from the high resolution prediction error signals in the transform domain.

10. A coder as claimed in claim 9 in which the low resolution prediction error signals in the transform domain are obtained by transforming low resolution prediction error signals in the pixel domain into the transform domain.

11. A coder as claimed in claim 1 in which there are three or more coding layers, the coding layers being arranged to provide coded signals at a series of different resolutions and in which each coder other than the lowest resolution coder provides prediction error signals which are subtracted from prediction error signals generated by the coder providing the next lower resolution coded signals.

12. A video coder comprising:
    a low resolution predictive coder to generate a low resolution prediction error signal;
    a high resolution predictive coder which compares a signal to be coded with a predicted signal to generate a high resolution prediction error signal,
    wherein said high resolution coder is connected to receive said low resolution prediction error signal and subtract said low resolution prediction error signal so that said high resolution prediction error signal represents only those prediction error components not present in said low-resolution prediction error signal,
    and wherein said high resolution coder has a predictor loop for generating said predicted signal, said predictor loop including means for adding said low resolution prediction error signal back into the loop.

13. A video coder for coding an input signal, comprising:
    a low resolution predictive coder section which generates a low resolution prediction error signal;
    a high resolution predictive coder section including a coder and further including:
    a predictor loop for generating a predicted signal, said predictor loop including a first circuit for adding the low resolution prediction error signal into said loop;
    a second circuit for comparing the input signal with the predicted signal; and
    a third circuit for subtracting the low resolution prediction error signal such that the input to said coder of said high resolution predictive coder section includes no error components present in the low resolution prediction error signal.

* * * * *